United States Patent [19]

Veltin, Jr.

[11] Patent Number: 4,471,603

[45] Date of Patent: Sep. 18, 1984

[54] DETACHABLE BLADES FOR ROTARY MOWERS

[76] Inventor: Arthur E. Veltin, Jr., 1033 Creswell La., Opelousas, La. 70570

[21] Appl. No.: 479,989

[22] Filed: Mar. 29, 1983

[51] Int. Cl.$^3$ .............................................. A01D 55/18
[52] U.S. Cl. ...................................... 56/295; 56/17.5
[58] Field of Search ........ 56/295, 17.5, 503, DIG. 17, 56/DIG. 20

[56] References Cited

U.S. PATENT DOCUMENTS

| | | | |
|---|---|---|---|
| 2,576,884 | 11/1951 | Leigh . | |
| 2,869,311 | 1/1959 | Beeston | 56/295 |
| 2,924,059 | 2/1960 | Beeston | 56/295 |
| 2,932,147 | 4/1960 | Beeston | 56/295 |
| 3,097,468 | 7/1963 | Johnson | 56/295 |
| 3,243,944 | 4/1966 | Michaud | 56/295 |
| 3,327,460 | 6/1967 | Blackstone . | |
| 3,447,291 | 6/1969 | Guetterman | 56/295 |
| 3,563,015 | 2/1971 | Renfroe | 56/295 |
| 3,683,606 | 8/1972 | Staines | 56/295 |
| 3,949,541 | 4/1976 | Henry | 56/295 |
| 4,375,148 | 3/1983 | Beck | 56/295 |

Primary Examiner—Gene Mancene
Assistant Examiner—John G. Weiss
Attorney, Agent, or Firm—John F. Sieberth

[57] ABSTRACT

A novel blade and a rotary mower blade assembly involving use of the blade are described. The blade has (a) an extended inner end portion and (b) a bifurcated outer end portion comprising (i) a forward radially-extending outer segment carrying at least a portion of the cutting edge, and (ii) a rearward radially-extending outer segment spaced apart from said forward segment. The blade assembly involves a pair of spaced apart looped retaining bands affixed to a rotary blade support arm. One of these bands is secured to an intermediate portion of the blade support arm and the loop of this band is sized to slidably receive and securely encircle a rearward portion of the blade. The other band is secured to an outer portion of the blade support arm and the loop of this band is sized to receive and encircle the rearward bifurcated segment of the blade (i.e., the segment constituting the trailing edge of the blade). In this case however, the width of the segment encircled by the band is less than the width of the space within the loop thus leaving a gap therebetween. A keeper is provided which can be snugly fitted into this gap and thereby keep the blade secured to the support arm.

20 Claims, 9 Drawing Figures

DETACHABLE BLADES FOR ROTARY MOWERS

BACKGROUND

Over the years various proposals have been made for providing detachable blades for rotary mowers. See for example the exemplary teachings of such U.S. Pat. Nos. 2,576,884 to Leigh, 2,869,311 to Beeston, Jr., 3,097,468 to Johnson, 3,327,460 to Blackstone, 3,447,291 to Guetterman, 3,563,015 to Renfroe, and 3,949,541 to Henry.

The use of detachable blades offers the advantage of enabling the blades to be removed for sharpening, repair, or replacement. However, previously designed detachable blades have not been without defects or shortcomings. For example, some constructions have required the application of considerable force to loosen or tighten nuts or the like in order to remove or apply the blades. For this purpose, torque wrenches are often required. Since specialized tools of this type are quite expensive, they are not always readily available for use in removing or applying the blades. Other constructions have involved mechanisms that are inconvenient, hard to reach and difficult to operate properly. Still others have been complicated in construction and expensive to manufacture.

A worthwhile and desirable contribution to the art would be the provision of a new and improved detachable rotary blade construction avoiding most if not all of the foregoing defects and shortcomings. This invention is believed to fulfill this objective in an efficient, straightforward, and economical manner.

SUMMARY OF THE INVENTION

Pursuant to this invention, improvements are provided in a rotary mower blade assembly comprising a cutting blade support arm, a blade detachably attachable to said support arm and means for detachably securing said blade to said support arm. In broad perspective, the improvements involve providing (1) a detachable attachable blade having a bifurcated outer end portion, and (2) a pair of spaced apart looped retaining bands affixed to the blade support arm. One of these bands is secured to an intermediate portion of the blade support arm and the loop of this band is sized to slidably receive and securely encircle a rearward portion of the blade. The other band is secured to an outer portion of the blade support arm and the loop of this band is sized to receive and encircle the rearward bifurcated segment of the blade (i.e., the segment constituting the trailing edge of the blade). In this case however, the width of the segment encircled by the band is less than the width of the space within the loop thus leaving a gap therebetween. Also pursuant to this invention, a keeper is provided which can be snugly fitted into this gap and thereby keep the blade secured to the support arm. It will be seen, therefore, that the keeper, preferably a looped spring clip or the like, can be readily fitted into and removed from the gap since the gap is positioned at the outer radial end of the blade between the fiburacted segments of the blade.

More specifically, therefore, this invention provides in a rotary mower blade assembly comprising a cutting blade support arm, a blade detachably attachable to said support arm and means for detachably securing said blade to said support arm, the improvement according to which:

(1) said blade has (a) an extended inner end portion and (b) a bifurcated outer end portion comprising (i) a forward radially-extending outer segment carrying at least a portion of the cutting edge, and (ii) a rearward radially-extending outer segment spaced apart from said forward segment;

(2) said means comprise (a) a first looped retaining band secured to an intermediate portion of said support arm, said first looped retaining band being adapted to slidably receive the inner end portion of said blade, and (b) a second looped retaining band secured to an outer portion of said support arm, the loop of said second looped retaining band (i) being adapted to slidably receive the rearward radially-extending outer segment of said blade, and (ii) being wider than said rearward segment to thereby leave a gap therebetween when said rearward segment is seated within said loop; and (3) keeper means adapted to be snugly fitted into said gap and thereby keep said blade secured to said support arm when said rearward segment of said blade is seated within the loop of said second looped retaining band and said extended inner end portion of said blade is seated within said first looped retaining band said blade being slidably removable from said first and said second looped retaining bands when said keeper means is not positioned within said gap.

In accordance with one preferred embodiment the foregoing forward radially-extending outer segment of said blade has a forwardly extending recess adapted to snugly receive a forward portion of said second looped retaining band (a) when said rearward radially-extending outer segment of said blade is seated within the loop of said second looped retaining band, (b) when said extended inner end portion of said blade is seated within said first looped retaining band, and (c) when said keeper means is snugly fitted into said gap.

Pursuant to another preferred embodiment the foregoing rearward radially-extending outer segment of said blade has a rearwardly extending lug adapted to fit over a shoulder in said support arm (a) when said rearward radially-extending outer segment of said blade is seated within the loop of said second looped retaining band, (b) when said extended inner end portion of said blade is seated within said first looped retaining band, and (c) when said keeper means is snugly fitted into said gap. The shoulder over which this rearwardly extending lug fits may be a suitably sized recess in the forward edge of the support arm the recessing being spaced a little inwardly from the outer end of the arm. Alternatively, the shoulder may constitute a stepped recess at the outer end of the support arm.

It is particularly advantageous to embody both of the foregoing preferred embodiments in the detachable blade assemblies of this invention.

According to still another preferred embodiment, the back edge of the extended inner end portion of the detachable blade is biased to facilitate insertion of said blade into and removal of said blade from said first and said second looped retaining bands when said keeper means is not positioned within said gap.

Still another embodiment of this invention involves the provision of the novel detachably attachable cutting blade itself. The blade is adapted to be secured to a cutting blade support arm of a rotary mower and has (a) an extended inner end portion and (b) a bifurcated outer end portion comprising (i) a forward radially-extending outer segment carrying at least a portion of the cutting edge, and (ii) a rearward radially-extending outer segment spaced apart from said forward segment.

These and other features, embodiments, advantages and characteristics of this invention will be still further apparent from the ensuing description, accompanying drawings, and appended claims.

DESCRIPTION OF THE PREFERRED EMBODIMENTS

Referring now to the drawings wherein like numerals are used to identify like parts among the several views, the preferred embodiment in the form depicted is composed in essence of only four parts associated with rotary blade support arm or shaft 10, namely, removable blade 30, outer retaining band 50, inner retaining band 70, and keeper 90. It will be understood of course that in the figures the overall blade assembly for only one end of rotary blade support 10 is shown and that normally a like assembly will be similarly positioned on the opposite end (not shown) of blade shaft 10. However if desired, the opposite end of shaft 10 may simply be counterbalanced with suitable weights so the mower is a single bladed rotary mower. And of course, one can utilize three or four overall blade assemblies of this invention with mowers having respectively three or four blade shafts 10 equally disposed around the axis of rotating.

While various configurations are entirely feasible, blade support arm or shaft 10 in the form depicted has an upwardly and outwardly flanged trailing edge 14. The outer radial end portion of shaft 10 has a recessed outer frontal portion 12 to accommodate blade 30. Thus the outer radial portion of shaft 10 is composed of shaft extension 17 and its upwardly and outwardly flanged trailing edge 14. An outer forward portion of shaft extension 17 has notch or recess 19.

In the form depicted, blade 30 has a forwardly extending beveled cutting edge 31, a bifurcated outer end portion composed of segments 32 and 33 and an inner end portion 35. Segments 32 and 33 are separated from each other by space 34, segment 32 being forwardly positioned relative to segment 33. The rearward portion of segment 32 has a forwardly extending recess 36 created in part by rearwardly lug 37. The rearward portion of segment 33 also has a rearwardly extending lug 38. The back edge of inner end portion 35 is biased at 39.

Figures 1, 2:
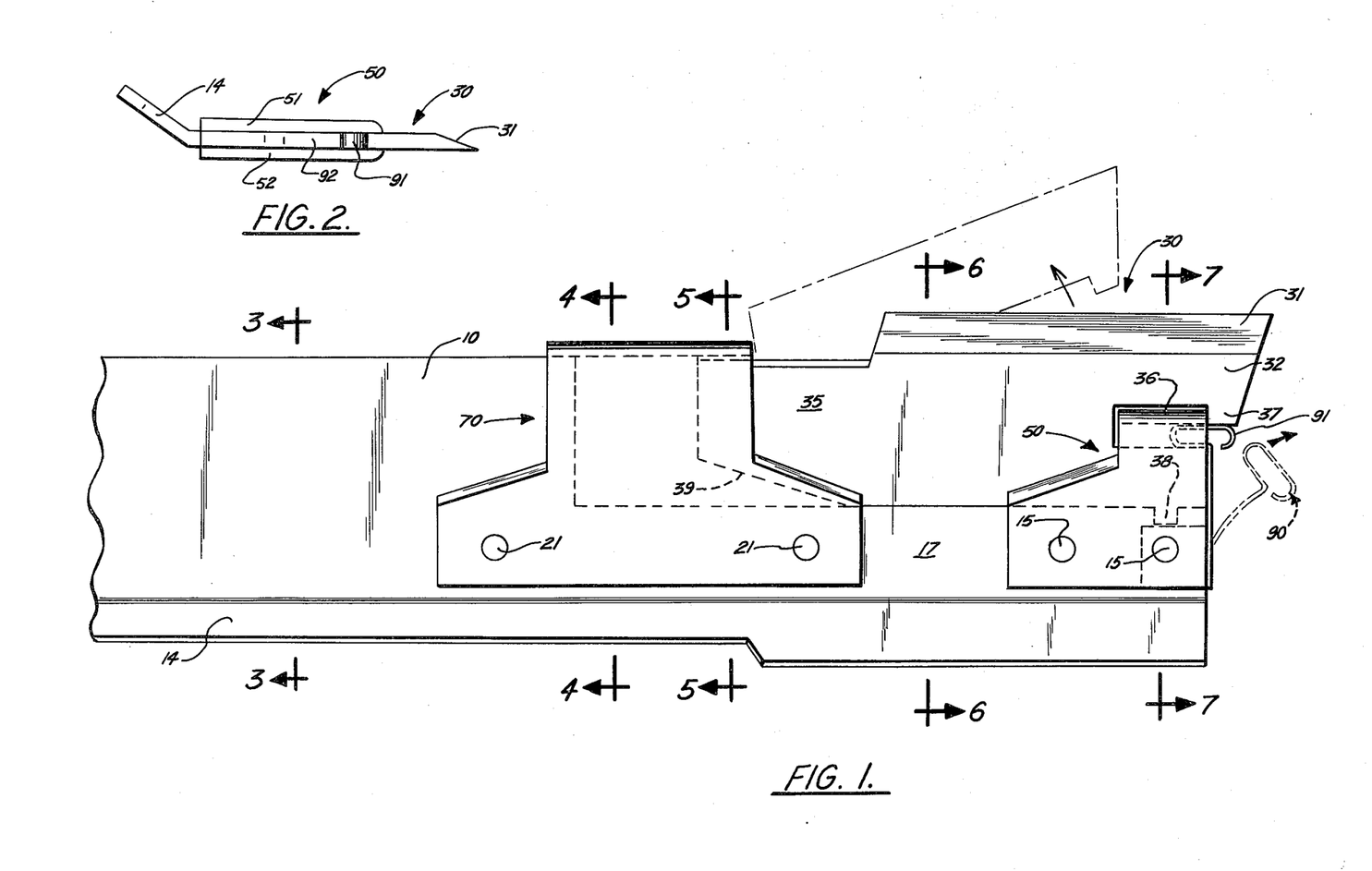
FIG. 1 is a fragmented plan view of a preferred detachable blade assembly of this invention.
FIG. 2 is a right side view of the assembly of FIG. 1.
Figure 3:
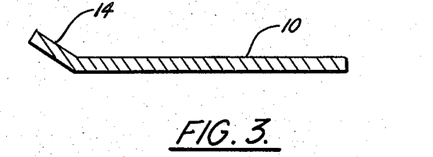
FIG. 3 is a section taken along line 3,3 of FIG. 1 as viewed in the direction of the arrows thereof.
Figure 4:
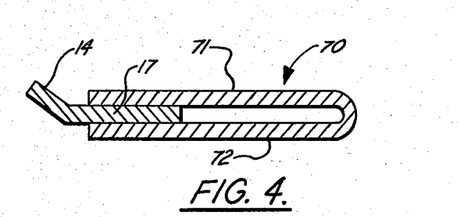
FIG. 4 is a section taken along line 4,4 of FIG. 1 as viewed in the direction of the arrows thereof.
Figure 7:
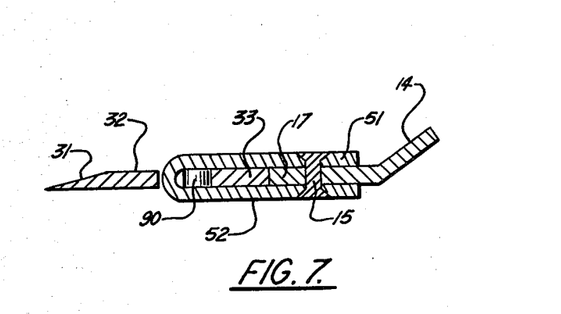
FIG. 7 is a section taken along line 7,7 of FIG. 1 as viewed in the direction of the arrows thereof.
Figure 8:
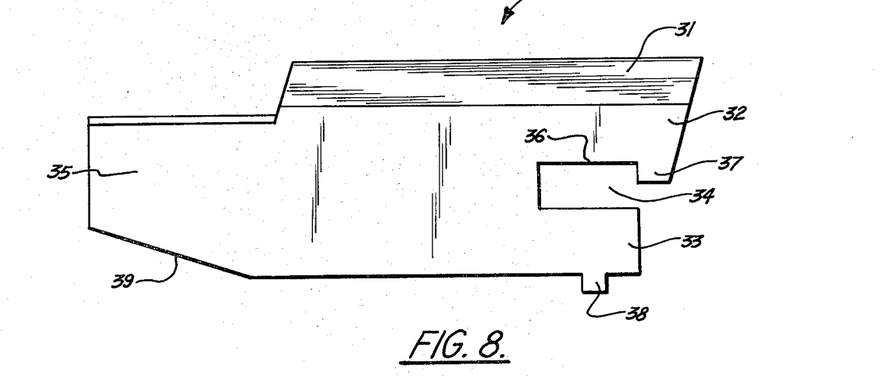
FIG. 8 is a plan view of the detachable blade of the assembly of FIG. 1.
Figure 9:
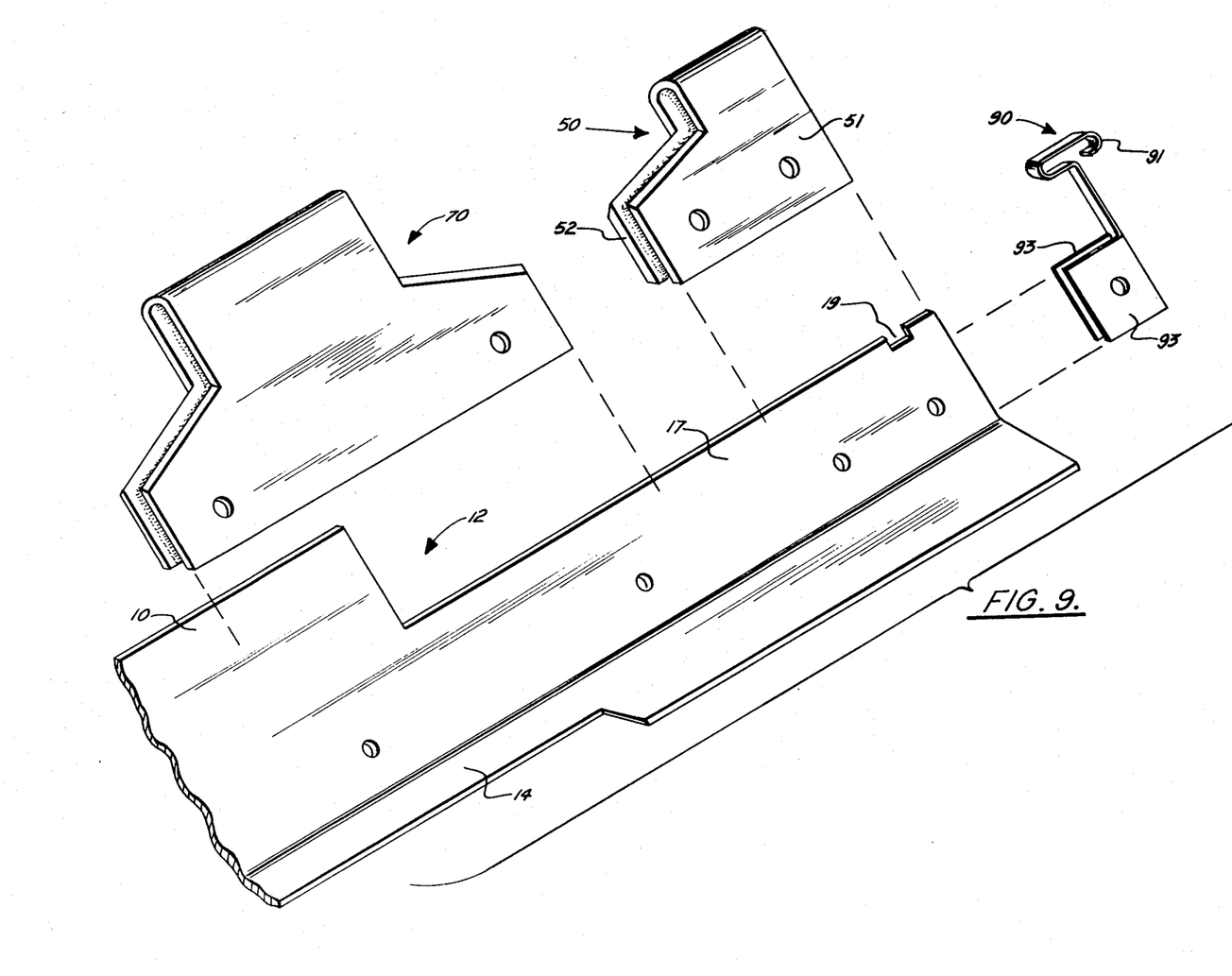
FIG. 9 is an exploded view in perspective of the outer end portion of the blade support sub-assembly of FIG. 1.

Outer retaining band 50 in the form depicted is a forwardly projecting U-shaped member composed of upper segment 51 and lower segment 52 secured to outer end portion of shaft extension 17 by means of rivets 15,15. Other equivalent methods of fastening such as spot welding or the like may of course be used. As can be readily seen from FIGS. 2 and 7, band 50 forms a closed loop projecting forwardly of shaft extension 17, the space between segments 51 and 52 being sufficient to slidably receive segment 33 of blade 30 with a reasonably snug fit. As indicated by FIGS. 2 and 7 the interior space within the closed loop of band 50 from front to back (not counting the space occupied by shaft extension 17) is greater than the width (from front to back) of segment 33 of blade 30. Thus when segment 33 is properly seated within band 50 (as in FIG. 1) there is a space or gap within the loop in front of segment 33 to snugly accommodate keeper 90. It will also be noted that when segment 33 is properly seated within band 50, lug 38 is seated in recess 19 and that lug 37 is seated over the outer forward shoulder of band 50 so that the forwardmost portion of band 50 fits within recess 36 of blade 30.

Figure 5:
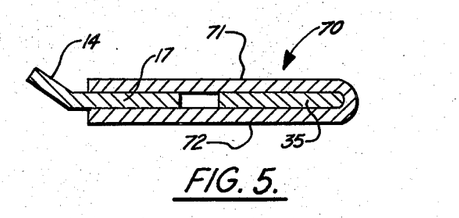
FIG. 5 is a section taken along line 5,5 of FIG. 1 as viewed in the direction of the arrows thereof.
Figure 6:
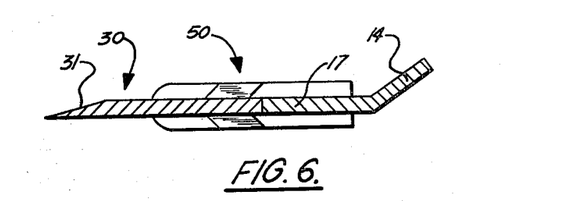
FIG. 6 is a section taken along line 6,6 of FIG. 1 as viewed in the direction of the arrows thereof.

Inner retaining band 70 in the form depicted is another forwardly projecting U-shaped member composed in this instance of upper segment 71 and lower segment 72 secured to an inner portion of shaft extension 17 to shaft 10 by means of rivets 21,21 or the like. The space between segments 71 and 72 is sufficient to slidably receive the inner end portion 35 of blade 30 with a reasonably snug fit. When the inner end portion 35 of blade 30 is properly seated within band 70 (as in FIG. 1), the back edge of blade 30 (including the back edge of segment 33) is secured against the front edge of shaft extension 17, and as indicated by FIGS. 1 and 5 the innermost forward edge of the inner end portion 35 is secured against at least a portion of the inside front edge of the loop of band 70.

Keeper 90 in the form depicted is an elongate spring clip which can be pressed under tension into the space or gap within the loop of band 50 in front of segment 33 of blade 30 when blade 30 is properly seated within bands 50 and 70 as depicted in FIG. 1. It can be seen from FIG. 1 that when keeper 90 is positioned in this manner, its outer end portion 91 extends outwardly beyond the outer edge of the space into which keeper 90 has been pressed so as to facilitate removal of the keeper when it is desired to remove and replace, repair or sharpen blade 30. In the form depicted outer end portion 91 is looped so that a hooked tool or other type prying device may be used for withdrawing keeper 90. It can also be seen that the keeper depicted is secured to shaft extension 17 by means of flexible shaft 92 and flanges 93,93. At least one of the rivets 15,15 securely fastens keeper 90 to extension 17 by means of aligned apertures through flanges 93,93 and extension 17. Shaft 92 connects with keeper 90 at a position intermediate the length of keeper 90. This insures that the outer end portion 91 of keeper 90 cannot be inadvertently forced into the space or gap in front of segment 33 when keeper 90 is being inserted into position.

Detachment and removal of the blade is a facile operation. As can readily be seen from FIG. 1 after withdrawing keeper 90, blade 30 is removed by rotating its outer edge forwardly so that lug 38 is retracted from recess 19 and lug 37 clears the outer forward shoulder of band 50. Then the blade is moved inwardly and its forward rotation is continued until all of segment 33 clears the forward edge of band 50. Then blade 30 is withdrawn outwardly and forwardly from a position such as shown by phantom lines in FIG. 1. It will be noted that the bias of the inner end portion 35 at 39 permits the forward rotation of blade 30 during this operation. It will also be noted that sufficient space is provided within band 70 so that inner end portion 35 may be moved inwardly for a distance sufficient to enable segment 33 to clear the inner side of band 50. At all times during this operation, cutting edge 31 remains outside of band 70.

Installation and attachment of the blade is equally facile as it merely involves conducting the reverse of the procedure just described. Thus the blade is placed with its inner end portion 35 angularly extending within the interior loop of band 70 so that the blade is in the position depicted by the phantom lines of FIG. 1. Then the outer end of the blade is rotated rearwardly until segment 33 can be fitted into keeper 50 and then the blade is moved outwardly and rotated rearwardly so that lug 38 fits into recess 19 and lug 37 fits over the outer forward should of band 50. Thereupon keeper 90 is installed.

The respective parts may be fabricated from various suitable materials of construction having the requisite strength and durability characteristics, such as metals, reinforced plastics, composites, and the like. Blades having steel cutting edges are preferred.

It can be seen from the foregoing that the systems of this invention such as depicted in the Figures offer several advantages. For example, keeper 90 is readily accessible for removal and insertion, and once keeper 90 has been removed it is a simple matter to remove and replace blade 30. In addition the system possesses safety features inasmuch as keeper 90 cannot be seated within the space or gap forward of segment 33 unless and until lug 38 has been seated in recess 19 and lug 37 has been properly fitted over the outer forward should of band 50. Thus the likelihood of operating the system with detachable blade 30 improperly seated and secured has been minimized if not eliminated. Furthermore, the systems of this invention are economical to produce since all parts can be made by inexpensive manufacturing procedures such as metal stamping or the like. Expensive operations such as milling and shaping are not required since extremely fine tolerances are not required.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof. Without limiting the generality of the foregoing, it will be understood for example that blade support shaft 10 need not have a flanged trailing edge 14. Further, when a flanged trailing edge 14 is present on the blade support shaft, the trailing edge may extend from the outer end of the shaft (as shown) to a locus at or near the mid-point of the shaft or it may terminate at any suitable locus therebetween, preferably inwardly from the inner edge of band 70. Furthermore, the angle of the slope of the trailing edge may be constant or it may be varied along the length of the shaft. In the latter case, for example, it may undergo a smooth transition along the shaft so that the angle of slope progressively diminishes along the length of its transition from an angle of, say, 35° to zero degrees (i.e., to a flat trailing edge). These and numerous other variants and modifications within the purview of this invention will now be readily apparent to those skilled in the art.

I claim:

1. In a rotary mower blade assembly comprising a cutting blade support arm, a blade detachably attachable to said support arm and means for detachably securing said blade to said support arm, the improvement according to which:
    said blade has
    an extended inner end portion and
    a bifurcated outer end portion comprising
        a forward radially-extending outer segment carrying at least a portion of the cutting edge, and
        a rearward radially-extending outer segment spaced apart from said forward segment:
    said means for detachably securing comprises
        a first looped retaining band secured to an intermediate portion of said support arm, said first looped retaining band being adapted to slidably receive the inner end portion of said blade, and
        a second looped retaining band secured to an outer portion of said support arm, the loop of said second looped retaining band
            being adapted to slidably receive the rearward radially-extending outer segment of said blade, and
            being wider than said rearward segment to thereby leave a gap therebetween when said rearward segment is seated within the loop of said second looped retaining band; and
        a keeper adapted to be snugly fitted into said gap and thereby keep said blade secured to said support arm when said rearward segment of said blade is seated within the loop of said second looped retaining band and said extended inner end portion of said blade is seated within said first looped retaining band;
    said blade being slidably removable from said first and said second looped retaining bands when said keeper is not positioned within said gap.

2. The improvement pursuant to claim 1 wherein said forward radially-extending outer segment of said blade has a forwardly extending recess adapted to snugly receive a forward portion of said second looped retaining band when said rearward radially-extending outer segment of said blade is seated within the loop of said second looped retaining band, when said extended inner end portion of said blade is seated within said first looped retaining band, and when said keeper is snugly fitted into said gap.

3. The improvement pursuant to claim 1 wherein said rearward radially-extending outer segment of said blade has a rearwardly extending lug adapted to fit over a shoulder in said support arm when said rearward radially-extending outer segment of said blade is seated within the loop of said second looped retaining band, when said extended inner end portion of said blade is seated within said first looped retaining band, and when said keeper is snugly fitted into said gap.

4. The improvement pursuant to claim 1 wherein:
    said forward radially-extending outer segment of said blade has a forwardly extending recess adapted to snugly receive a forward portion of said second looped retaining band when said rearward radially-extending outer segment of said blade is seated within the loop of said second looped retaining band, when said extended inner end portion of said blade is seated within said first looped retaining band, and when said keeper is snugly fitted into said gap; and said rearward radially-extending outer segment of said blade has a rearwardly extending lug adapted to fit over a shoulder in said support arm when said rearward radially-extending outer segment of said blade is seated within the loop of said second looped retaining band, when said extended inner end portion of said blade is seated within said first looped retaining band, and when said keeper is snugly fitted into said gap.

5. The improvement pursuant to claim 1 wherein the back edge of the extended inner end portion of said blade is biased to facilitate insertion of said blade into and removal of said blade from said first and said second looped retaining bands when said keeper is not positioned within said gap.

6. The improvement pursuant to claim 1 wherein:

said forward radially-extending outer segment of said blade has a forwardly extending recess adapted to snugly receive a forward portion of said second looped retaining band when said rearward radially-extending outer segment of said blade is seated within the loop of said second looped retaining band, when said extended inner end portion of said blade is seated within said first looped retaining band, and when said keeper means is snugly fitted into said gap; and the back edge of the extended inner end portion of said blade is biased to facilitate insertion of said blade into and removal of said blade from said first and said second looped retaining bands and to facilitate separation of the forward portion of said outer looped retaining band from said forwardly extending recess when said keeper is not positioned within said gap.

7. The improvement pursuant to claim 1 wherein:

said rearward radially-extending outer segment of said blade has a rearwardly extending lug adapted to fit over a shoulder in said support arm when said rearward radially-extending outer segment of said blade is seated within the loop of said second looped retaining band, when said extended inner end portion of said blade is seated within said first looped retaining band, and when said keeper is snugly fitted into said gap; and the back edge of the extended inner end portion of said blade is biased to facilitate insertion of said blade into and removal of said blade from said first and said second looped retaining bands and to facilitate separation of said rearwardly extending lug from said shoulder when said keeper is not positioned within said gap.

8. The improvement pursuant to claim 1 wherein:

said forward radially-extending outer segment of said blade has a forwardly extending recess adapted to snugly receive a forward portion of said second looped retaining band when said rearward radially-extending outer segment of said blade is seated within the loop of said second looped retaining band, when said extended inner end portion of said blade is seated within said first looped retaining band, and when said keeper is snugly fitted into said gap;

said rearward radially-extending outer segment of said blade has a rearwardly extending lug adapted to fit over a shoulder in said support arm when said rearward radially-extending outer segment of said blade is seated within the loop of said second looped retaining band, when said extended inner end portion of said blade is seated within said first looped retaining band, and when said keeper is snugly fitted into said gap; and the back edge of the extended inner end portion of said blade is biased to facilitate insertion of said blade into and removal of said blade from said first and said second looped retaining bands, separation of the forward portion of said outer looped retaining band from said forwardly extending recess, and separation of said rearwardly extending lug from said shoulder:

all such facilitation being possible when said keeper is not positioned within said gap.

9. The improvement pursuant to claim 1 wherein said keeper comprise a looped spring which is under compression when snugly fitted into said gap.

10. The improvement pursuant to claim 1 wherein said keeper comprise a looped spring which is under compression when snugly fitted into said gap, said spring being further characterized by having a looped portion thereof protruding beyond the outer end of said gap when said spring is snugly fitted into said gap.

11. The improvement of claim 10 wherein said spring is secured to the outer end portion of said support arm by means of a flexible shaft connected to said spring at a locus intermediate its length so that said shaft keeps said looped portion of said spring protruding beyond the outer edge of said gap when said spring is snugly fitted into said gap.

12. In a rotary mower blade assembly comprising a cutting blade support arm, a blade detachably attachable to said support arm and means for detachably securing said blade to said support arm, the improvement according to which:

said arm has a recessed outer frontal portion to accommodate said blade;

said blade has an extended inner end portion and a bifurcated outer end portion comprising a forward radially-extending outer segment carrying at least a portion of the cutting edge, and a rearward radially-extending outer segment spaced apart from said forward segment;

said means for detachably securing comprises a first looped retaining band secured to an intermediate portion of said support arm, said first looped retaining band being positioned so that the loop thereof encircles the innermost portion of the recessed outer frontal portion of said arm, said first looped retaining band being adapted to slidably receive the inner end portion of said blade, and a second looped retaining band secured to an outer portion of said support arm, said second looped retaining band positioned so that the loop thereof encircles an outermost portion of the recessed outer frontal portion of said arm, the loop of said second looped retaining band being adapted to slidably receive the rearward radially-extending outer segment of said blade, and being wider than said rearward segment to thereby leave a gap therebetween when said rearward segment is seated within the loop of said second looped retaining band; and a keeper adapted to be snugly fitted into said gap and thereby keep said blade secured to said support arm when said rearward segment of said blade is seated within the loop of said second looped retaining band and said extended inner end portion of said blade is seated within said first looped retaining band:

said blade being slidably removable from said first and said second looped retaining bands when said keeper is not positioned within said gap.

13. The improvement pursuant to claim 12 wherein said recessed outer frontal portion of said arm is longer than said blade.

14. The improvement pursuant to claim 13 wherein:

said forward radially-extending outer segment of said blade has a forwardly extending recess adapted to snugly receive a forward portion of said second looped retaining band when said rearward radially-extending outer segment of said blade is seated within the loop of said second looped retaining band, when said extended inner end portion of said blade is seated within said first looped retaining band, and when said keeper is snugly fitted into said gap;

said rearward radially-extending outer segment of said blade has a rearwardly extending lug adapted to fit over a shoulder in said support arm when said rearward radially-extending outer segment of said blade is seated within the loop of said second looped retaining band, when said extended inner end portion of said blade is seated within said first looped retaining band, and when said keeper is snugly fitted into said gap; and the back edge of the extended inner end portion of said blade is biased to facilitate insertion of said blade into and removal of said blade from said first and said second looped retaining bands, to facilitate separation of the forward portion of said outer looped retaining band from said forwardly extending recess, and to facilitate separation of said rearwardly extending lug from said shoulder:

all such facilitation being possible when said keeper is not positioned within said gap.

15. A detachable cutting blade adapted to be secured to a cutting blade support arm of a rotary motor, said blade having an extended inner end portion, and a bifurcated outer end portion comprising a forward radially-extending outer segment carrying at least a portion of the cutting edge, and a rearward radially-extending outer segment spaced apart from said forward segment:

the back edge of said forward radially-extending outer segment of said blade having a forwardly extending recess therein.

16. The blade of claim 15 further characterized in that the back edge of said inner end portion is biased.

17. The blade of claim 15 further characterized in that the back edge of said rearward radially-extending outer segment of said blade has a rearwardly extending lug.

18. The blade of claim 17 further characterized in that the back edge of said inner end portion is biased.

19. A detachable cutting blade adapted to be secured to a cutting blade support arm of a rotary motor, said blade having an extended inner end portion, and a bifurcated outer end portion comprising a forward radially-extending outer segment carrying at least a portion of the cutting edge, and a rearward radially-extending outer segment spaced apart from said forward segment:

the back edge of said rearward radially-extending outer segment of said blade having a rearwardly extending lug.

20. The blade of claim 19 further characterized in that the back edge of said inner end portion is biased.

* * * * *

UNITED STATES PATENT AND TRADEMARK OFFICE
CERTIFICATE OF CORRECTION

PATENT NO. : 4,471,603

DATED : SEPTEMBER 18, 1984

INVENTOR(S) : ARTHUR E. VELTIN, JR.

It is certified that error appears in the above-identified patent and that said Letters Patent is hereby corrected as shown below:

Column 1, line 7, reads "U. S. Pat. Nos.", and should read -- U. S. Patents as --;

Column 1, line 59, reads "fiburcated", and should read -- bifurcated --.

Column 3, line 47, reads "rotating", and should read -- rotation --;

Column 3, line 64, reads "rearwardly lug", and should read -- rearwardly extending lug --.

Column 5, line 20, reads "should", and should read -- shoulder --;

Column 5, line 36, reads "should", and should read -- shoulder --.

Column 7, line 27, reads "keeper means is", and should read -- keeper is --.

Column 8, line 19, reads "comprise" -- and should read -- comprises --;

Column 8, line 22, reads "comprise" -- and should read -- comprises --;

UNITED STATES PATENT AND TRADEMARK OFFICE
CERTIFICATE OF CORRECTION

PATENT NO. : 4,471,603
DATED : SEPTEMBER 18, 1984
INVENTOR(S) : ARTHUR E. VELTIN, JR.

It is certified that error appears in the above-identified patent and that said Letters Patent is hereby corrected as shown below:

Column 8, line 60, reads "band positioned", and should read -- band being positioned --.

Column 10, line 9, reads "rotary motor", and should read -- rotary mower --;

Column 10, line 28, reads "rotary motor", and should read -- rotary mower --.

Signed and Sealed this

Seventh Day of May 1985

[SEAL]

Attest:

DONALD J. QUIGG

Attesting Officer     Acting Commissioner of Patents and Trademarks